(12) United States Patent
Sallstrom et al.

(10) Patent No.: US 6,341,478 B1
(45) Date of Patent: Jan. 29, 2002

(54) STEERABLE CUTTING UNIT WITH STEERABLE AND LEVEL LIFT GRASS CATCHER

(75) Inventors: Steven A. Sallstrom, Plymouth; Gary R. Lamusga, Prior Lake; Howard H. Bohm, Crystal, all of MN (US)

(73) Assignee: The Toro Company, Minneapolis, MN (US)

(*) Notice: Subject to any disclaimer, the term of this patent is extended or adjusted under 35 U.S.C. 154(b) by 0 days.

(21) Appl. No.: 09/333,175

(22) Filed: Jun. 14, 1999

(51) Int. Cl.[7] .............................................. A01D 34/44
(52) U.S. Cl. ................................. 56/7; 56/249; 56/199
(58) Field of Search .............................. 56/7, 199, 198, 56/249, 6, 294, 253

(56) References Cited

U.S. PATENT DOCUMENTS

| | | | | |
|---|---|---|---|---|
| 2,475,671 A | * | 7/1949 | McCartney | ...................... 56/7 |
| 3,408,801 A | | 11/1968 | Kroll | |
| 4,191,007 A | * | 3/1980 | Check et al. | .................. 56/199 |
| 4,769,976 A | * | 9/1988 | Bassett et al. | .................... 56/7 |
| 5,042,236 A | * | 8/1991 | Lamusga et al. | ................. 56/7 |
| 5,142,852 A | * | 9/1992 | Nelson | ....................... 56/16.6 |
| 5,228,277 A | * | 7/1993 | Smith et al. | .................. 56/16.9 |
| 5,293,729 A | | 3/1994 | Curry et al. | |
| 5,343,680 A | * | 9/1994 | Reichen et al. | ................ 56/249 |
| 5,412,931 A | * | 5/1995 | Reichen et al. | ................ 56/199 |
| 5,533,326 A | | 7/1996 | Goman et al. | |
| 5,628,169 A | * | 5/1997 | Stiller et al. | ...................... 56/7 |
| 5,970,690 A | * | 10/1999 | Toman | ............................ 56/7 |
| 6,044,631 A | * | 4/2000 | Anderson et al. | ................ 56/7 |

\* cited by examiner

Primary Examiner—Robert E. Pezzuto
Assistant Examiner—Árpád Fábián Kovács
(74) Attorney, Agent, or Firm—James W. Miller

(57) ABSTRACT

A mower includes a traction frame that supports at least one cutting unit and a grass catcher associated with each cutting unit. The cutting unit and grass catcher are both operatively coupled to the traction frame such that they both jointly are able to steer or yaw together during turns of the traction frame. This permits the gap between the cutting unit and a grass basket which is part of the grass catcher to remain constant whether the traction frame is travelling straight or is turning. This ensures that the grass clippings will be properly retained in the grass basket without dribbling out of the grass basket. In addition, a system is provided for keeping the grass catcher level as it is lifted up out of engagement with the ground into a raised, transport position, also to better retain the grass clippings within the grass basket.

24 Claims, 3 Drawing Sheets

STEERABLE CUTTING UNIT WITH STEERABLE AND LEVEL LIFT GRASS CATCHER

TECHNICAL FIELD

This invention relates to a mower having a steerable reel-type cutting unit. This invention also relates to a mower having a steerable grass catcher associated with a steerable reel-type cutting unit in which the grass catcher is supported on a frame separate from the cutting unit so that the weight of the grass catcher is not carried on the cutting unit. More particularly, this invention relates to such a mower in which the grass catcher as well as the cutting unit can be raised and lowered between a cutting position and a transport position.

BACKGROUND OF THE INVENTION

Mowers equipped with reel-type cutting units are well known for precision mowing on golf courses and the like. For example, a riding greensmower comprises a traction vehicle on which multiple reel-type cutting units are mounted for mowing golf greens or similar surfaces. Each cutting unit typically comprises a rotatable reel that sweeps the grass against a fixed bedknife and front and rear rollers for allowing the cutting unit to roll over the ground. A grass catcher is mounted generally in front of the cutting unit. The grass catcher includes a grass basket having a rearwardly facing mouth into which the cutting unit throws grass clippings during operation of the greensmower.

In some known mowers of this type, the cutting units can steer themselves about high steering points, i.e. steering points located above the cutting unit, during turns of the mower. For example, if the mower turns to the right, the cutting units similarly steer or yaw to the right in response to the turn. However, in so steering or yawing, these known mowers tend to roll the cutting unit about a longitudinal, horizontal axis such that the end of the cutting unit on the inside of the turn becomes more heavily loaded than the end of the cutting unit on the outside of the turn. This can gouge or scuff the turf which is obviously undesirable. This uneven loading or uneven weight distribution on the cutting unit can also occur when the cutting unit rolls to follow the ground contour even when the cutting unit is travelling straight.

In addition, most of the known reel mowers having steerable cutting units also support the grass basket on the cutting unit itself. Thus, as the grass basket fills with clippings, the weight of the grass basket and the clippings is substantially carried or borne by the cutting unit. A grass basket can hold thirty pounds or so of grass clippings. This additional weight is effectively transferred to the cutting unit frame and lowers the height of cut of the reel from the nominal height the reel cuts when the grass basket is not attached or is empty. This change in the height of cut is also undesirable.

At least some mowers manufactured by The Toro Company, the assignee of this invention, do not place the weight of the grass catcher on the cutting unit to thereby avoid the undesirable change in the height of cut described above. In these mowers, the grass catcher is carried on a support frame that attaches to the mower rather than to the cutting unit such that the weight of the grass catcher and its clippings is not substantially carried by the cutting unit. Further, the cutting unit is often towed or propelled by the grass catcher support frame through two pull link arms that extend from the grass catcher support frame to each side of the cutting unit. While the ends of the pull link arms attach to the cutting unit through ball joints to let the cutting unit roll and pitch relative to the ground to follow the ground contour, the pull link arms and their attachment to a non-steerable grass catcher support frame do not allow the cutting unit to steer or yaw during turns of the mower. Thus, these cutting units slightly skid or wobble during turns.

U.S. Pat. No. 5,533,326, which is assigned to The Toro Company, the assignee of this invention, replaces the two pull link arms on known prior Toro mowers with a single pull link arm attached by a ball joint to the front and middle of the cutting unit. This cutting unit now has movement in all three axes and specifically can steer or yaw during turns of the mower. However, the grass catcher in this mower does not similarly turn or yaw in the same way as the associated cutting unit. Thus, the spacing between the mouth of the grass basket and the cutting reel varies across the width of the cutting unit during a turn. The spacing changes during a turn with the side of the cutting reel on the inside of the turn moving further away from the grass basket and the side of the cutting reel on the outside of the turn moving closer to the grass basket.

This spacing change between the cutting unit and the grass basket can lead to certain operational difficulties. These difficulties include the cutting reel engaging and damaging the grass basket as well as the grass clippings not being properly thrown into the grass basket or falling out of the grass basket in the gap between the cutting unit and the grass basket. To avoid these difficulties, the mower shown in the 326 patent has a partial front shield between the cutting reel and the grass catcher and a flexible seal or barrier extending between this front shield and the mouth of the grass basket.

The use of a front shield/flexible seal as shown in the 326 patent is effective for compensating for the potential problems caused by the change in spacing between the grass basket and the cutting unit during turns. However, when cutting wet and/or sticky grass, the front shield and flexible seal present surfaces and edges to which the grass can adhere and build-up. This build-up can be so extreme that the cutting unit becomes plugged with the area between the grass catcher and the cutting unit, i.e. the area on the top of the flexible seal, becoming more or less substantially filled with grass clippings. Also, the clumps of accumulated clippings occasionally fall to the ground, leaving an unsightly mess. This requires that the mower be stopped and cleaned, which is obviously something that is best avoided. Accordingly, there is a need in the art for another way of solving any problems that are caused by the fact that in some mowers the cutting units can steer during turns of the mower while their separately supported grass catchers cannot.

Mowers of this type also have a lift and lower system for lifting and lowering the cutting units and their grass catchers between cutting and transport positions. In fact, this is done frequently when mowing a green since the operator will lift the cutting units and grass catchers at the end of one pass while the mower is swung around off the green to prepare for another pass and will then lower the cutting units and grass catchers back down as the mower approaches the green for the next cutting pass. One difficulty with some known grass catcher designs is that the baskets tip rearwardly as they are lifted with the result that some clippings could fall out of the baskets when they are lifted. If the flexible seal of the 326 patent is removed, the clippings that fall out of the grass basket would then dribble down onto the ground or fall into the cutting unit, both of which are undesirable.

U.S. Pat. No. 3,408,801 to Kroll, which is assigned to the Toro Manufacturing Corporation, the predecessor of the assignee of this invention, The Toro Company, discloses a walk behind greensmower having a single cutting unit and grass catcher. The grass catcher in the 801 patent has brackets on the sides of the grass catcher which receive pins on the frame of the mower. This pin/bracket configuration allows the grass catcher to shift on the frame of the mower when the user lifts the front of the mower by pushing down on the handle of the mower. The shift in the grass catcher is designed to maintain the grass catcher in a level orientation or even to allow the grass catcher to tip forwardly relative to the mower, thereby to better retain the clippings in the grass catcher.

The pin/bracket configuration shown in the 801 patent does not directly and positively keep the grass catcher level or tipped forwardly during lifting of the front of the mower. It relies on the force of gravity acting on the various components and would be affected by the weight distribution of the clippings inside the grass catcher. Thus, there may be some conditions in which the grass catcher would not reliably shift or tip forwardly during lifting of the front of the mower. Also, the pin/bracket connections shown in the 801 patent potentially would provide excessive movement of the grass basket relative to the mower especially when used on a riding mower capable of relatively higher speed operation. Accordingly, there is still a need in the art for a leveling system for a grass catcher which acts positively on the catcher to ensure that the catcher will always be maintained in a desired position as the lift and lower system operates.

SUMMARY OF THE INVENTION

One aspect of this invention relates to a mower which comprises a traction frame. A reel-type cutting unit is provided having a cutting unit frame, a rotatable reel and cooperating bedknife carried on the cutting unit frame, and front and rear rollers carried on the cutting unit frame for allowing the cutting unit to rest on and roll over the ground when the cutting unit is disposed in a cutting position in engagement with the ground as the traction frame moves over the ground. The cutting unit has a weight distribution or loading of an instantaneous nominal value when the cutting unit is on level, flat ground. The cutting unit is operatively coupled to the traction frame in a manner that permits the cutting unit to roll about a horizontal longitudinal x axis and to pitch about a horizontal transverse y axis to follow the ground contour and to steer or yaw about a vertical z axis when the traction frame is turning. The cutting unit is operatively coupled to the traction frame such that the cutting unit steers or yaws about a steering point that is located above and in front of the cutting unit such that the cutting unit casters about this steering point during turns of the traction frame. Finally, the cutting unit is operatively coupled to the traction frame in a manner such that the weight distribution or loading on the cutting unit remains substantially at the instantaneous nominal value thereof even as the cutting unit steers or yaws during turns of the vehicle.

Another aspect of this invention relates to a mower in which the grass catcher and cutting unit both steer or yaw during turns of the mower. This aspect is provided in a mower which comprises a traction frame. A reel-type cutting unit is operatively coupled to the traction frame in a manner that permits the cutting unit to steer or yaw during turns of the traction frame. In addition, a grass catcher is operatively coupled to the traction frame. The grass catcher is located adjacent the cutting unit for receiving grass clippings from the cutting unit. The grass catcher is supported independently of the cutting unit such that the weight of the grass catcher and accumulated grass clippings therein is not substantially carried by the cutting unit. The grass catcher is also operatively coupled to the traction frame in a manner that permits the grass catcher to also steer or yaw during turns of the traction frame.

Yet another aspect of this invention relates to a mower having a level lift grass catcher. This aspect is provided in a mower which comprises a traction frame. A reel-type cutting unit is operatively coupled to the traction frame. A grass catcher is operatively coupled to the traction frame, the grass catcher being located adjacent the cutting unit for receiving grass clippings from the cutting unit. The grass catcher is supported independently of the cutting unit such that the weight of the grass catcher and accumulated grass clippings therein is not substantially carried by the cutting unit. A lift frame is attached to the grass catcher for raising and lowering the grass catcher into and out of engagement with the ground. The lift frame is pivotally connected to the traction frame for rotation about a substantially horizontal pivot axis on the traction frame such that the grass catcher is raised and lowered relative to the ground as the lift frame pivots upwardly and downwardly relative to the traction frame about the substantially horizontal pivot axis on the traction frame. The lift frame is further pivotally connected to the grass catcher such that the grass catcher pivots about a substantially horizontal pivot axis on the lift frame to adjust the orientation of the grass catcher relative to the lift frame as the lift frame pivots upwardly and downwardly relative to the traction frame. A tilt rod extends between the traction frame and the grass catcher to positively tilt the grass catcher forwardly as the lift frame rises.

The above described aspects of this invention are just some of the various aspects of this invention which exist. This invention includes other aspects which have not been specifically enumerated in this Summary of the Invention.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
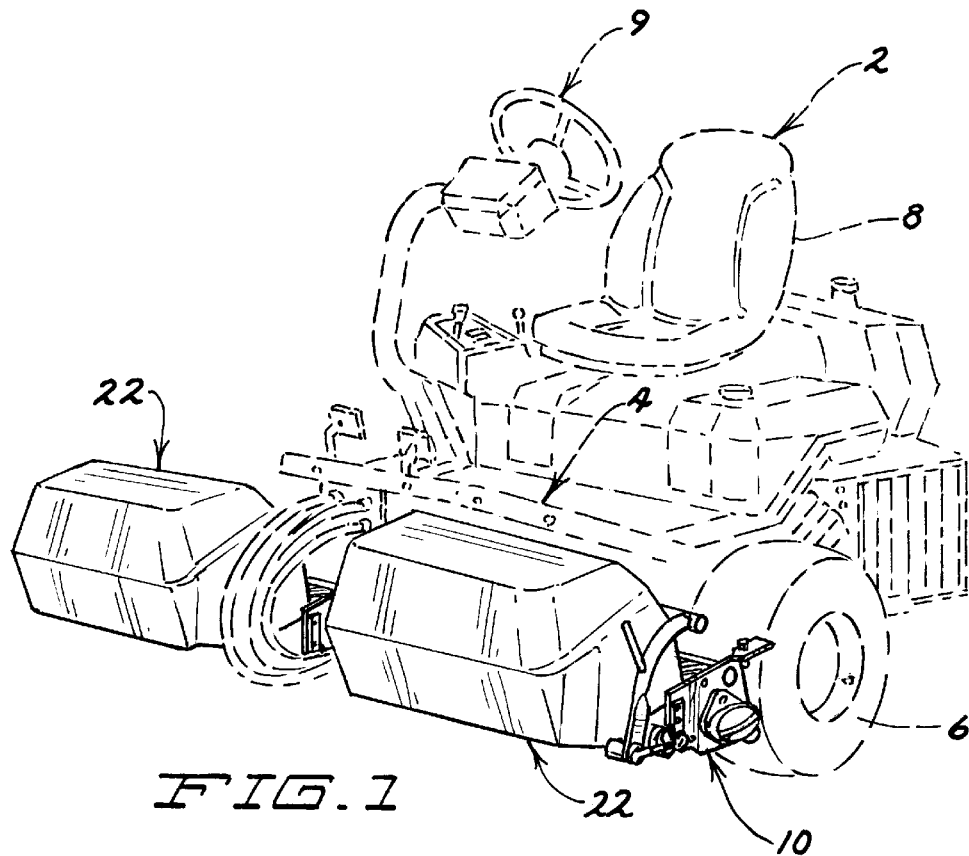
FIG. 1 is a perspective view of a mower illustrating two front cutting units with accompanying grass catchers according to this invention, a rear cutting unit being present but being hidden in FIG. 1 beneath the mower.

A mower 2 is illustrated in the drawings which includes a traction frame 4 that is movably supported on the ground by various wheels 6. As depicted herein, mower 2 comprises a self-propelled riding greensmower that is operated by an operator who sits on a seat 8 carried on traction frame 4. Two front cutting units 10 extend forwardly from traction frame 4 and are located in advance of the two front wheels 6 of mower 2. A similar center cutting unit (not shown) is carried beneath traction frame 4 to overlap with front cutting units 10 to cut the swath of grass that would otherwise be left between front cutting units 10. At least one rear wheel (not shown) is at the rear end of traction frame 4. At least some or all of the front and rear wheels 6 are driven by the engine or motor of mower 2 to propel traction frame 4, and hence cutting units 10, over the ground. At least some of the wheels 6, typically the rear wheel, are steerable to allow the operator to turn or steer mower 2 using an input from steering wheel 9.

Figure 2:
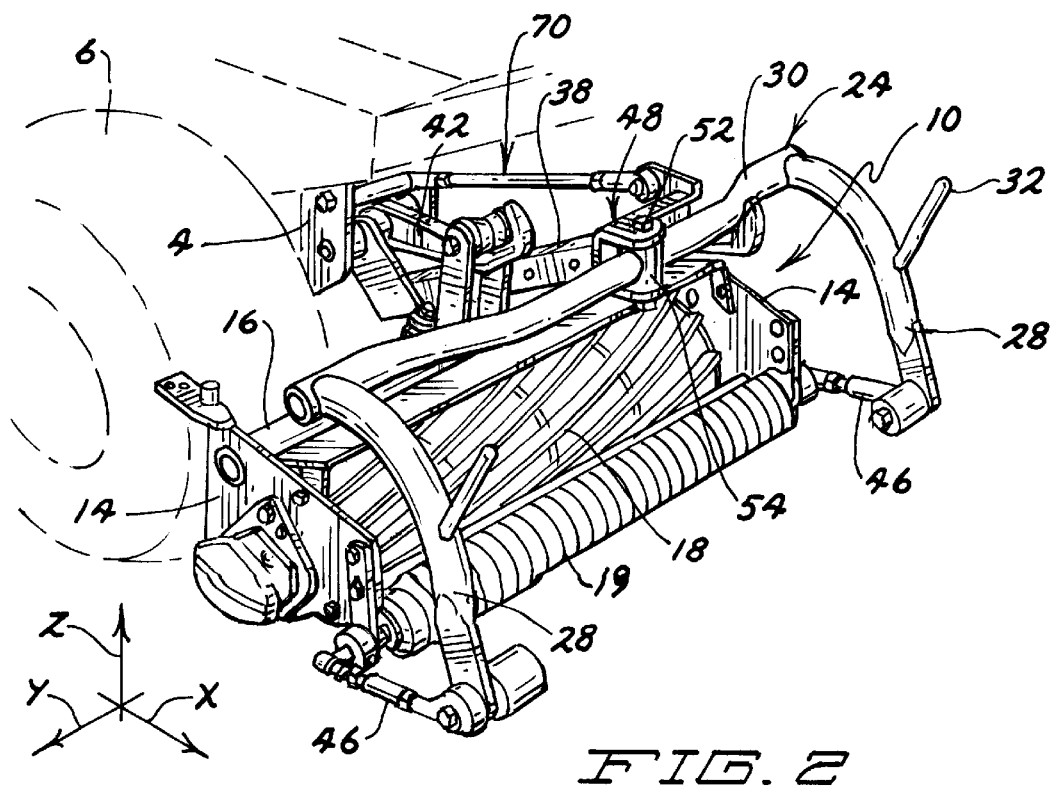
FIG. 2 is an enlarged perspective view of one of the cutting units shown in FIG. 1 with the grass basket removed to illustrate various portions of the support frame of the grass catcher.
Figure 4:
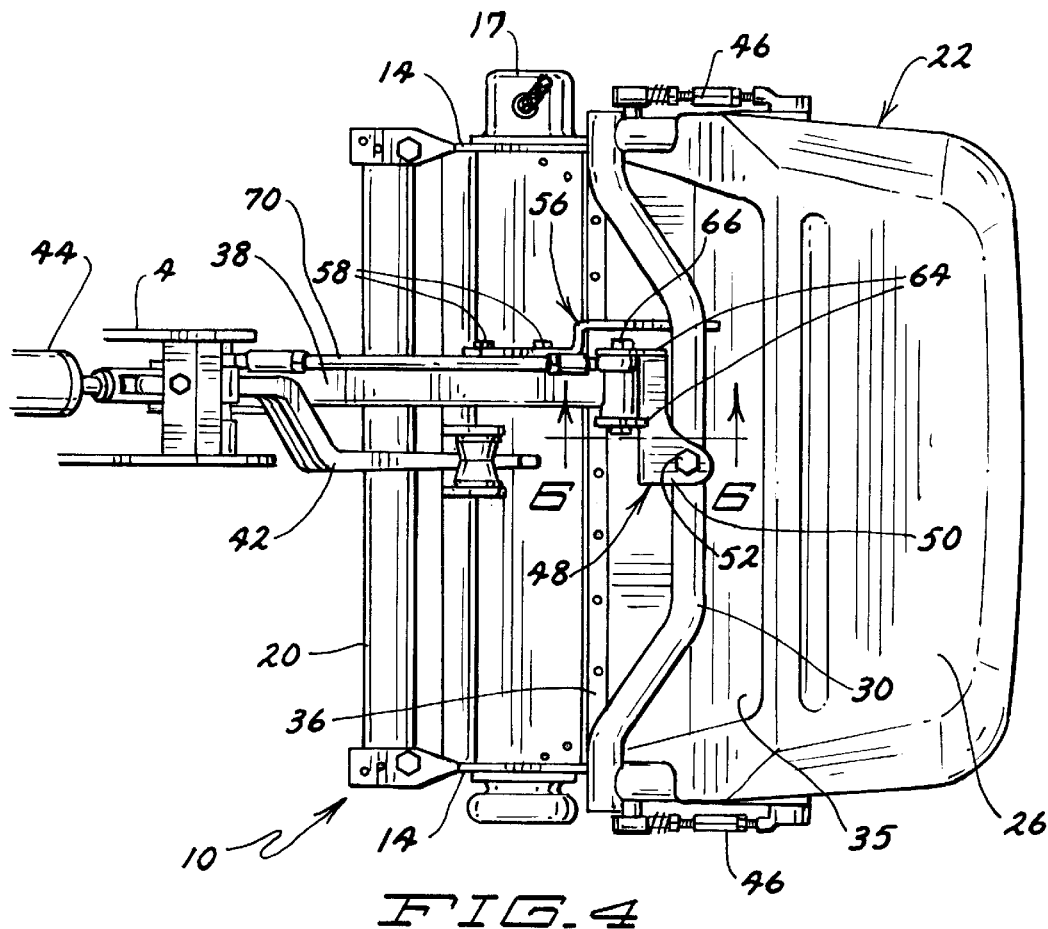
FIG. 4 is a top plan view of one of the cutting units shown in FIG. 1 and its accompanying grass catcher.
Figure 3:
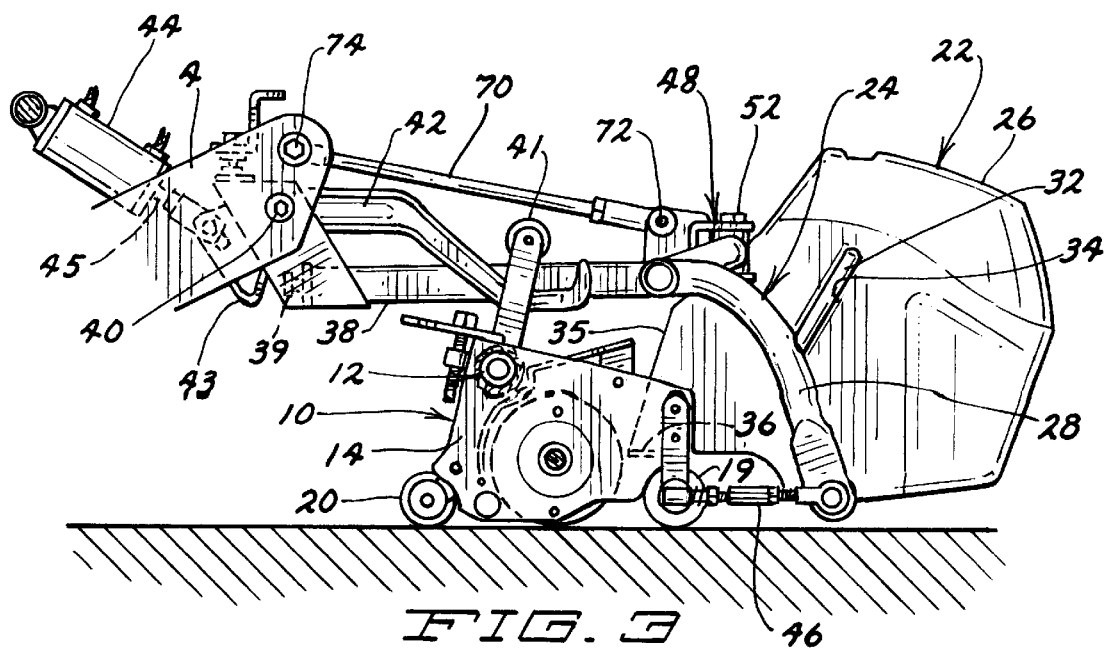
FIG. 3 is a side elevational view of one of the cutting units shown in FIG. 1 and its accompanying grass catcher.

Referring to FIGS. 2 and 3, each cutting unit 10 preferably is of the cutting reel type and includes a cutting unit frame 12 defined by spaced side plates 14 that are united or joined by various cross members 16. A rotatable reel 18 and fixed bedknife (not shown) are carried between side plates 14 with reel 18 serving to sweep standing grass against a sharpened cutting edge on the bedknife to cut the grass. As shown in FIG. 4, reel 18 is rotated by a hydraulic motor 17 or, the like mounted on one of the side plates 14 and operated by any conventional hydraulic system carried on traction frame 4, though reel 18 could also be powered by an electric motor or a mechanical drive system or the like. Cutting unit 10 includes front and rear support rollers 19 and 20 which permit cutting unit 10 to be self-supporting on the ground and to roll over the ground as mower 2 travels over the ground.

As will be described more completely below, cutting unit 10 is free to move relative to the ground about three axes of movement. More specifically, cutting unit 10 can roll about a horizontal longitudinal axis x, can pitch about a horizontal transverse axis y, and can yaw about a vertical axis z. The xyz axes are depicted in FIG. 2. Movement of cutting unit 10 about the x and y axes allows cutting unit 10 to float relative to the ground to follow the contours of the surface it is cutting. Movement about the z axis allows cutting unit 10 to steer or turn itself during turns of mower 2.

The front of reel 18 above front support roller 19 is preferably open all the way to the top of reel 18. Neither partial front shield in front of reel 18 nor a flexible seal between the front shield and the grass catcher are used in this preferred embodiment, though they could be used if so desired. Reel 18 rotates in a direction so that grass clippings will be discharged forwardly from reel 18. A grass catcher 22 is located in advance of cutting unit 10 to catch and retain these grass clippings.

Grass catcher 22 includes a U-shaped or forked support frame 24 on which a grass basket 26 is releasably mounted. Support frame 24 includes two spaced, forwardly and downwardly extending legs 28 connected together at their upper ends by a transverse cross member 30. Each leg 28 includes an upwardly extending horn 32 which interfits with a groove 34 located on each side of grass basket 26 to releasably hold grass basket 26 in place on support frame 24 in a known manner. Grass basket 26 itself comprises a generally enclosed container or receptacle including an open mouth 35 having a lower lip 36, mouth 35 facing rearwardly when grass basket 26 is mounted on support frame 24. Grass clippings are thrown from reel 18, by virtue of the rotation of reel 18, through mouth 35 of grass basket 26 to be retained therein. Grass basket 26 can be periodically removed from support frame 24 and dumped to empty grass basket 26 of its accumulated grass clippings.

A lift and lower system is provided for lifting grass catcher 22 and cutting unit 10 out of a lowered cutting position and placing them in an elevated transport position. This lift and lower system includes a lift frame 38 that is pivotally connected at its rear end to a first substantially horizontal pivot axis 40 on a portion of traction frame 4. The forward end of lift frame 38 is joined to support frame 24. In addition, a lift arm 42 is also pivotally coupled for rotation about axis 40. The rear end 43 of lift arm 42 is connected to the piston rod 45 of a hydraulic actuator 44.

Figure 5:
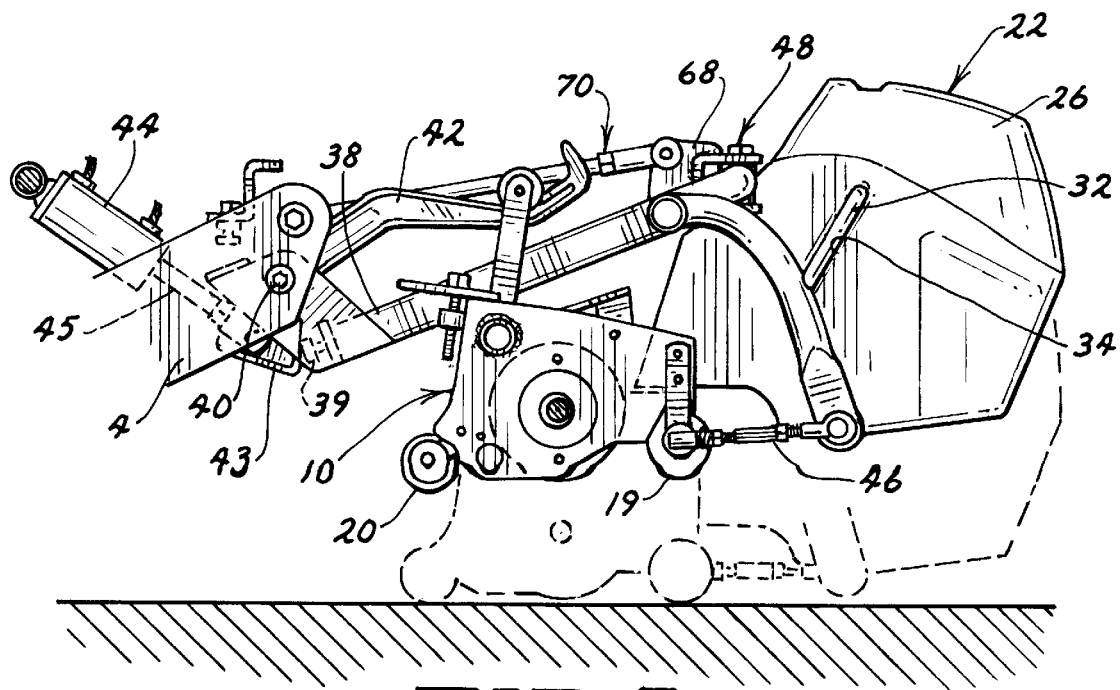
FIG. 5 is a side elevational view similar to FIG. 3 of one of the cutting units shown in FIG. 1 and its accompanying grass catcher, the phantom line illustration showing the cutting unit and its accompanying grass catcher lowered into a cutting position and the solid line illustration showing the cutting unit and its accompanying grass catcher raised into a transport position.

Referring to FIGS. 3 and 5, lift arm 42 pivots in a counter-clockwise direction about pivot axis 40 when the piston rod 45 of actuator 44 is extended out of the cylinder of actuator 44. Lift arm 42 engages beneath a lift roller 41 on cutting unit 10 to lift cutting unit 10 off the ground. This is depicted in FIG. 5. At some point in the extension of piston rod 45, the rear end 43 of lift arm 42 abuts against a stop 39 on the rear end of lift frame 38 to also begin pivoting lift frame 38 in a counter-clockwise direction about pivot axis 40. Stop 39 can be adjusted so that lift frame 38 begins rising before lift arm 42 has engaged lift roller 41, at approximately the same time as lift arm 42 engages lift roller 41, or even after lift arm 42 has engaged lift roller 41. In any event, lift frame 38 will similarly be pivoted in a counter-clockwise direction after stop 39 is engaged by the rear end 43 of lift arm 42 to raise grass catcher 22 out of its cutting position closely adjacent the ground and into its elevated transport position.

When piston rod 45 of hydraulic actuator 44 is retracted, lift frame 38 and lift arm 42 correspondingly lower both grass catcher 22 and cutting unit 10 back down into the lowered cutting position shown in FIG. 3.

Lift frame 38 and its connection at one end to traction frame 4 and at the other end to support frame 24 additionally serves as the link which propels both cutting unit 10 and grass catcher 22 forwardly as traction frame 4 moves forwardly. As traction frame 4 moves forwardly, lift frame 38 directly pushes support frame 24 and grass catcher 22 forwardly as well. Two pull link arms 46 extend from the lower ends of legs 28 on support frame 24 and connect to each side of cutting unit 10 at approximately the same height as the centerline of front roller 19 by attaching to extended end portions of the axle or support shaft of front roller 19. Ball joint connections are used on the rear ends of pull link arms 46 where such arms 46 connect to cutting unit 10 to ensure that cutting unit 10 can move in the x and y axes relative to the ground. The forward ends of pull link arms 46 are pivotally coupled to legs 28 of support frame 24. As support frame 24 is propelled forwardly by lift frame 38, cutting unit 10 is similarly propelled forwardly, albeit indirectly, by pull link arms 46.

U.S. Pat. No. 5,533,326 shows a prior art mower having a steerable cutting unit with an integral lift frame/support frame for the grass catcher. As described in the Background of the Invention section of this application, a consequence of this design is that grass catcher 22 does not steer or yaw during turns of traction frame 4 as does cutting unit 10. Thus, the gap or distance between reel 18 and lower lip 36 of mouth 35 of grass basket 26 does not remain constant during turns, leading to the possibility of incomplete grass retention in grass basket 26 and/or contact between grass basket 26 and cutting unit 10.

Mower 2 of this invention has a cutting unit 10 that steers or yaws during turns and a grass catcher 22 which can also itself yaw or steer during turns of traction frame 4 in a manner that corresponds to the yawing or steering of cutting unit 10. Thus, the gap or distance between reel 18 and lower lip 36 of mouth 35 of grass basket 26 does not change during turns but remains substantially constant. As a result, there is no danger that grass basket 26 might contact cutting unit 10. Moreover, the grass distribution into grass basket 26 remains the same without there being an increased tendency for the clippings to miss grass basket 26 or to fall out of grass basket 26.

In a preferred embodiment, lift frame 38 is no longer integral with support frame 24 as in the 326 patent. Instead, lift frame 38 and support frame 24 are pivotally connected by a substantially vertical pivot axis connection 48. Pivot axis connection 48 is located forwardly of and above cutting unit 10 as shown in FIG. 3 to form a high steering point for cutting unit 10. Pivot axis connection 48 is also located on the longitudinal centerline of cutting unit 10. Thus, cutting unit 10 will properly trail behind pivot axis connection 48 and, during turns of mower 2, will steer or yaw about pivot axis connection 48 in a caster type manner.

As shown in the drawings, pivot axis connection 48 comprises a U-shaped cradle 50 on the front end of lift frame 38. Cradle 50 overlies a central portion of cross member 30 of support frame 24. A vertical pivot pin or rod 52 is installed through cradle 50. A bushing 54 can be mounted on cross member 30 to receive pivot rod 52 and pivotally journal support frame 24 on pivot rod 52. Thus, by virtue of pivot connection 48, support frame 24 can now steer or yaw about the vertical or z-axis.

Because grass catcher 22 is now capable of yawing about the substantially vertical axis defined by pivot rod 52, it is possible for grass catcher 22 to be cocked or canted to one side at the time the lift and lower system is activated by the operator. In other words, there will be times when grass catcher 22 is pivoted to one side or the other about pivot rod 52 with one leg 28 of support frame 24 being further forward than the other leg 28 of support frame 24 at the exact moment that the operator extends piston rod 45 of hydraulic actuator 44 to pivot lift frame 38 upwardly. If this happens, the Applicants have discovered that cutting unit 10 will be tipped or tilted to one side when it is also raised. This is not desirable.

Accordingly, this invention also preferably includes a grass catcher transport bracket 56 that is bolted to one side of lift frame 38 by a plurality of bolts 58. See FIG. 4. The forward portion of grass catcher transport bracket 56 extends forwardly and underlies a portion of cross member 30 of support frame 24. The forward portion of transport bracket 56 has an upwardly facing arcuate recess or groove 60 that is designed to mate with the underside of cross member 30.

Figure 7:
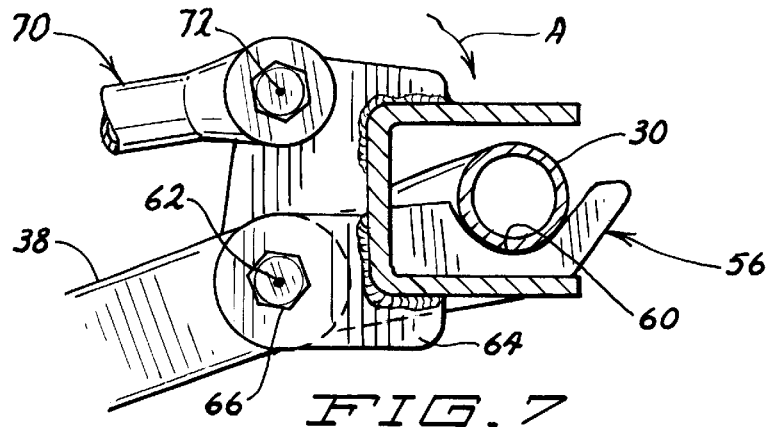
FIG. 7 is a partial side elevational view similar to FIG. 6 of one of the cutting units and its accompanying grass catcher, illustrating the orientation of the grass catcher transport bracket relative to a portion of the support frame for the grass catcher when the cutting unit and its accompanying grass catcher are raised into a transport position.
Figure 6:
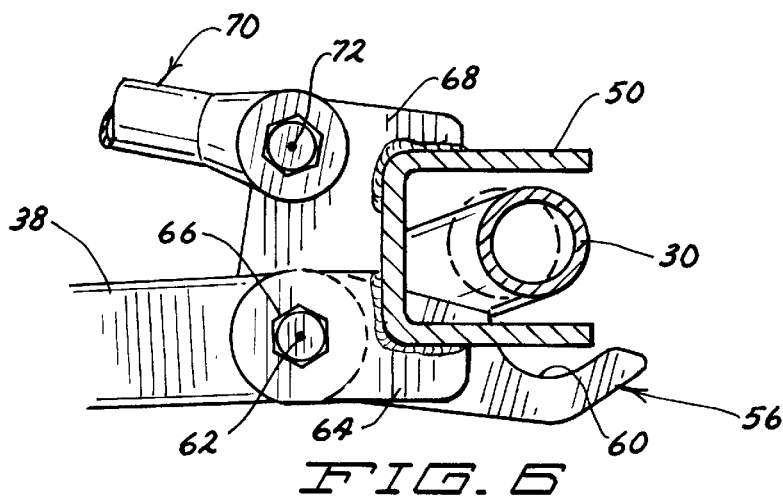
FIG. 6 is a partial side elevational view of one of the cutting units and its accompanying grass catcher taken along lines 6—6 in FIG. 4, illustrating the orientation of the grass catcher transport bracket relative to a portion of the support frame of the grass catcher when the cutting unit and its accompanying grass catcher are lowered into a cutting position.

Normally, when grass catcher 22 is disposed in its lowered cutting position, groove 60 in transport bracket 56 is spaced from cross member 30 as shown in FIG. 6. However, as described below, if the lift and lower system is activated and lift frame 38 is raised, groove 60 in transport bracket 56 will eventually engage cross member 30 as shown in FIG. 7. If grass catcher 22 is not straight at this time such that cross member 30 is cocked or canted relative to the position it would have if grass catcher 22 were straight, one canted position being indicated in phantom in FIG. 6 compared to the solid line position which indicates a straight orientation, transport bracket 56 will cam support frame 24 in whatever direction is required to cause cross member 30 to become seated within groove 60. In effect, transport bracket 56 straightens support frame 24 out so that the central portion of cross member 30 becomes perpendicular to a straight ahead direction of travel of traction frame 4 and stabilizes grass catcher 22 in such straightened condition. This allows cutting unit 10 to be suspended evenly relative to grass catcher 22 without tilting to one side or the other.

Obviously, for grass catcher transport bracket 56 to perform the above noted function, there must be some relative motion between transport bracket 56 and support frame 24 as the lift and lower system is activated. This relative motion is provided by another aspect of this invention, which will be described hereafter, relating to keeping grass catcher 22 level as it lifts. Namely, grass catcher 22 is tilted forwardly relative to lift frame 38 to maintain a level orientation as catcher 22 rises. As a result, cross member 30 of support frame 24 is actually brought into engagement with transport bracket 56 which can thus be affixed to lift frame 38. However, transport bracket 56 could still be used even if grass catcher 22 did not tip forwardly as part of a level lift feature, but this would require that transport bracket 56 be supported on some portion of traction frame 4 other than lift frame 38 and that transport bracket 56 be potentially reoriented to ensure that groove 60 contacts cross member 30 at the end of its rise to perform the grass catcher straightening function.

Consider now the operation of cutting unit 10 and grass catcher 22 when cutting and when these components are placed in a cutting position as shown in FIG. 3. When mower 2 is travelling straight ahead, lift frame 38 propels support frame 24, and hence grass catcher 22, forwardly and cutting unit 10 is also propelled forwardly through pull link arms 46. Cutting unit 10 is free to roll and pitch about the x and y axes to follow the ground contour because of the ball joints at the rear of pull link arms 46 as well as the pivotal connections at the front of pull link arms 46.

When mower 2 turns to one side or the other, the ground acting on cutting unit 10 imposes side forces on the cutting unit which forces want to steer or yaw the cutting unit about the z axis to accommodate the turn. This steering or yawing is now permitted in mower 2 of this invention, even with the use of dual pull link arms 46, because of the inclusion of the substantially vertical pivot axis connection 48. Effectively, cutting unit 10 is able to caster or turn itself about connection 48. There is no active steering of cutting unit 10, but the steering that is involved is purely a consequence of the natural castering that is now able to take place about vertical pivot axis connection 48.

As cutting unit 10 turns, the dual pull link arms 46 also act on support frame 24 to similarly and correspondingly steer or yaw grass catcher 22. Thus, in every turn of mower 2, both cutting unit 10 and its associated grass catcher 22 steer or yaw together in the same direction and in approximately the same amount about pivot connection 48.

The use of dual pull link arms 46 which are spaced to either side of the longitudinal centerline of cutting unit 10, instead of a single pull link arm that is centered on the centerline of cutting unit 10 as shown in the 326 patent, ensures that grass catcher 22 and cutting unit 10 steer together and maintain a constant clearance between lip 36 and reel 18. Pull link arms 46 are adjustable in length to be able to adjust or vary this clearance, but once adjusted the length of pull link arms 46 remains constant during operation of mower 2 until manually readjusted. Since pull link arms 46 have a nominally fixed length that does not vary during operation of mower 2, pull link arms 46 cause grass catcher 22 to turn similarly to cutting unit 10. If there is some looseness or play in the length of pull link arms 46 due to manufacturing tolerances or wear as mower 2 ages, there may, at times, be a slight mismatch in the turning of grass catcher 22 compared to cutting unit 10, but overall grass catcher 22 turns approximately the same amount as does cutting unit 10.

Pull link arms 46 transmit force between support frame 24 and cutting unit 10 only along the longitudinal x axis to pull or propel cutting unit 10, but do not transmit force along the y or z axes. As in the 326 patent, pull link arms 46 preferably connect to cutting unit 10 along the longitudinal centerline of front roller 19. In addition, as noted earlier, pull link arms 46 also are pivotally coupled by ball joints to cutting unit 10 and by additional pivots to support frame 24. Thus, when mower 2 negotiates a turn and cutting unit 10 steers or yaws about the z axis defined by pivot axis connection 48, the weight distribution or loading on cutting unit 10, for example the down force measured on the edge of front roller 19 on the inside of the turn, does not substantially change from the instantaneous nominal value it would have had when mower 2 was travelling straight on flat ground. In other words, if 20 pounds of down force had been present on that side of front roller 19 immediately before the turn, approximately 20 pounds of down force would still be present on that side of front roller 19 during the turn, thereby preventing cutting unit 10 from tending to dig or roll that side of the cutting unit 10 into the ground and gouging or scuffing the turf. This desirable result is accomplished in mower 2 of this invention even with a high steering point located above cutting unit 10 as represented by pivot axis connection 48, which is obviously easier to accomplish from a structural standpoint than using a low steering point as in the 326 patent.

As just noted, grass catcher 22 is desirably kept level as it rises into its transport position. This preferably should be done in a foolproof, reliable manner to ensure a level lift for grass catcher 22. This will keep the grass clippings in grass basket 26 and prevent them from spilling or dribbling out.

In addition to being pivotally mounted by the substantially vertical pivot axis connection 48 to permit steering or yawing relative to traction frame 4, as already described, grass catcher 22 of this invention is additionally mounted for pivoting about a substantially horizontal pivot axis 62 on the front end of lift frame 38. U-shaped cradle 50 that forms part of pivot connection 48 is additionally provided with a rearwardly extending clevis formed by spaced, parallel ears 64. These ears 64 are pivotally mounted on a substantially horizontal pivot rod 66 carried on the front end of lift frame 38. Thus, support frame 24 can pivot about horizontal pivot axis 62 as cradle 50 pivots about pivot rod 66, and further can pivot about a vertical axis as support frame 24 pivots about vertical pivot rod 52 carried by cradle 50.

One of the ears 64 that forms the pivot receiving clevis on U-shaped cradle 50 has an extended upper portion 68 that sticks up above lift frame 38. A tilt rod 70 has a forward end pivotally secured to this extended upper portion 68 of ear 64 as shown by a pivot axis 72 and a rearward end pivotally secured to traction frame 4 as shown by a pivot axis 74. Tilt rod 70 is arranged and configured to pivot or tilt support frame 24 forwardly relative to lift frame 38 about horizontal pivot rod 66 as support frame 24 is lifted by the lift and lower system. This forward pivoting motion of support frame 24, which is indicated by the arrows A in FIG. 7, is chosen to be just the right amount to maintain grass catcher 22 level as it is lifted. If desired, tilt rod 70 could also be configured to cause grass catcher 22 to even tip slightly forwardly in its raised position. In either case, keeping grass catcher 22 level or tipping it forwardly as it lifts will ensure that the grass clippings are retained in grass basket 26 and will not fall out of grass basket 26. Thus, tilt rod 70 at least keeps or maintains the grass catcher level as it lifts which means that grass catcher 26 is either kept substantially level or is tipped forwardly during lifting.

The level lift system just described for grass catcher 22 works in a positive and foolproof manner. It does not rely on gravity or the weight distribution of the grass clippings within grass basket 26. Tilt rod 70 will as a consequence of the geometry of the parts and of the lifting action provided by the lift and lower system always pivot grass catcher 22 to keep it level. Thus, the operator need not fear that the grass clippings will fall or dribble out of grass basket 26 even in the transport position of grass catcher 22.

Moreover, the level lift system just described works by tilting support frame 24 of grass catcher 22. Since support frame 24 is connected by pull link arms 46 to cutting unit 10, tilting support frame 24 also tilts cutting unit 10 similarly to maintain the distance between cutting unit 10 and grass catcher 22 as the two lift.

Various modifications of this invention will be apparent to those skilled in the art. While the various features of this invention comprising a steerable grass catcher 22, i.e. a grass catcher 22 that can yaw about a substantially vertical pivot axis, and a level lift system for grass catcher 22 are preferably used together on the same grass catcher, these features could also be used separately. In other words, one could have a mower with a steerable grass catcher 22 without also attempting to keep this grass catcher level, and vise versa. In addition, while mower 2 has been shown as comprising a riding greensmower, mower 2 could also be one where the operator walks behind traction frame 4 and is not seated thereon.

Moreover, the number of cutting units and associated grass catchers could obviously vary as long as at least one cutting unit and one grass catcher are used on traction frame 4. Reference in any of the claims to "a" cutting unit or "a" grass catcher simply means that at least one cutting unit or at least one grass catcher is being claimed but is not meant to limit the claim to covering only a single cutting unit or a single grass catcher. Each of the cutting units 10 and grass catchers 22 attached to traction frame 4 as described herein, namely both of the front as well as the center cutting unit and their associated grass catchers, are generally identical so that the foregoing description applies equally to each of the cutting units 10 and grass catchers 22.

Accordingly, the invention is to be limited only by the appended claims.

We claim:

1. A mower, which comprises:
   (a) a traction frame;
   (b) a reel-type cutting unit operatively coupled to the traction frame in a manner that permits the cutting unit to steer or yaw during turns of the traction frame; and
   (c) a grass catcher operatively coupled to the traction frame, the grass catcher being located adjacent the cutting unit for receiving grass clippings from the cutting unit, the grass catcher being supported independently of the cutting unit such that the weight of the grass catcher and accumulated grass clippings therein is not substantially carried by the cutting unit, and the grass catcher also being pivotally coupled to the traction frame in a manner that permits the grass catcher to also steer or yaw relative to the traction frame during turns of the traction frame.

2. The mower of claim 1, wherein the reel-type cutting unit and the grass catcher steer together in the same direction and in approximately the same amount during turns of the traction frame.

3. The mower of claim 1, wherein the grass catcher further includes a substantially vertical pivot axis connection to the traction frame to permit the grass catcher to steer or yaw relative to the traction frame.

4. The mower of claim 3, wherein the grass catcher comprises a support frame and a grass basket releasably connected to the support frame for receiving and retaining the grass clippings, and wherein the vertical pivot axis connection is located on the support frame.

5. The mower of claim 3, wherein the vertical pivot axis connection on the grass catcher is carried on a lift frame for raising and lowering the grass catcher relative to the ground, the lift frame being pivotally connected to the traction frame for rotation about a substantially horizontal pivot axis on the traction frame such that the grass catcher is raised and lowered relative to the ground as the lift frame pivots upwardly and downwardly relative to the traction frame about the substantially horizontal pivot axis on the traction frame.

6. The mower of claim 5, wherein the grass catcher comprises:
   (a) a forked support frame having spaced apart, downwardly extending legs connected by a cross member; and
   (b) a grass basket releasably connected to the support frame and extending between the legs of the support frame for receiving and retaining the grass clippings.

7. The mower of claim 6, wherein the vertical pivot axis connection is located on the cross member of the support frame.

8. The mower of claim 5, wherein the grass catcher is further pivotally carried on the lift frame for rotation about a substantially horizontal pivot axis on the lift frame to adjust the orientation of the grass catcher relative to the lift frame as the lift frame pivots upwardly and downwardly.

9. The mower of claim 8, further including a tilt rod extending between the traction frame and the grass catcher to positively tilt the grass catcher forwardly as the lift frame rises.

10. The mower of claim 9, wherein the tilt rod is configured such that the amount of the forward tilting of the grass catcher is sufficient to at least keep the grass catcher level as it lifts.

11. The mower of claim 8, further including a grass catcher transport bracket carried on the lift frame for engaging the grass catcher as the grass catcher lifts and for straightening the grass catcher about the vertical pivot axis connection to place the grass catcher in a substantially perpendicular orientation relative to the traction frame's direction of movement.

12. The mower of claim 1, wherein the traction frame is part of a self-propelled riding vehicle.

13. The mower of claim 1, further including a plurality of cutting units and a plurality of grass catchers operatively coupled to the traction frame, wherein each cutting unit has one grass catcher associated therewith for receiving the grass clippings from such cutting unit.

14. A mower, which comprises:
   (a) a traction frame;
   (b) a reel-type cutting unit operatively coupled to the traction frame, the cutting unit having a predetermined width;
   (c) a grass catcher operatively coupled to the traction frame, the grass catcher being located adjacent the cutting unit but with the weight of the grass catcher being supported independently of the cutting unit, the grass catcher including a grass basket for receiving grass clippings from the cutting unit with the grass basket having a mouth through which the grass clippings are thrown with the mouth of the grass basket being spaced from the cutting unit by a gap; and
   (d) wherein the reel-type cutting unit and the grass catcher are both operatively coupled to the traction frame in a manner that allows both the reel-type cutting unit and the grass catcher to steer or yaw relative to the traction frame during turns of the traction frame with the gap between the mouth of the grass basket and the cutting unit remaining substantially constant in size across the width of the cutting unit whether the traction frame is travelling straight or is turning.

15. The mower of claim 14, further including a lift and lower system for raising and lowering both the cutting unit and the grass catcher relative to the ground between a raised transport position and a lowered cutting position, respectively, and wherein the lift and lower system is configured to at least maintain the grass catcher level relative to the ground in its raised transport position.

16. The mower of claim 14, further including a plurality of cutting units and a plurality of grass catchers operatively coupled to the traction frame, wherein each cutting unit has one grass catcher associated therewith for receiving the grass clippings from such cutting unit.

17. A mower, which comprises:
   (a) a traction frame;
   (b) a grass catcher operatively coupled to the traction frame to be propelled by the traction frame, wherein the grass catcher comprises:
      (i) a forked support frame having spaced apart, downwardly extending legs connected by a cross member; and
      (ii) a grass basket releasably connected to the support frame and extending between the legs of the support frame for receiving and retaining the grass clippings, the grass basket having a rearwardly facing mouth when connected to the support frame;
   (c) a substantially vertical pivot axis connection between the cross member of the forked support frame and the traction frame such that the grass catcher can pivot about the vertical pivot axis connection;
   (d) a reel-type cutting unit trailing the grass catcher and arranged adjacent thereto such that the reel-type cutting unit throws grass clippings into the grass basket through the mouth of the grass basket; and
   (e) two pull link arms extending between the legs of the support frame and opposite sides of the reel-type cutting unit for pulling the cutting unit forwardly as the traction frame propels the support frame forwardly, the two pull link arms being configured relative to the cutting unit and the support frame to permit the cutting unit to roll and pitch about longitudinal and transverse horizontal axes to follow the ground contour, and the two pull link arms allowing the cutting unit and the grass catcher to steer or yaw together about the substantially vertical pivot axis connection during turns of the traction frame.

18. The mower of claim 17, wherein the cutting unit is supported by front and rear rollers for rolling over the ground, and wherein the two pull link arms connect to the cutting unit at generally the same height as a rotational axis of the front roller such that the cutting unit can steer or yaw without inducing a roll in the cutting unit.

19. The mower of claim 17, wherein the support frame of the grass catcher is operatively coupled to the traction frame by a lift frame that is pivotally connected at one end to the traction frame and at the other end is connected by the substantially vertical pivot axis connection to the cross member of the support frame of the grass catcher.

20. The mower of claim 19, further including a lift arm pivotally connected at one end to the traction frame for lifting the cutting unit.

21. A mower, which comprises:
(a) a traction frame;
(b) a reel-type cutting unit operatively coupled to the traction frame;
(c) a grass catcher operatively coupled to the traction frame, the grass catcher being located adjacent the cutting unit for receiving grass clippings from the cutting unit, the grass catcher being supported independently of the cutting unit such that the weight of the grass catcher and accumulated grass clippings therein is not substantially carried by the cutting unit;
(d) a lift frame attached to the grass catcher for raising and lowering the grass catcher relative to the ground, the lift frame being pivotally connected to the traction frame for rotation about a substantially horizontal pivot axis on the traction frame such that the grass catcher is raised and lowered relative to the ground as the lift frame pivots upwardly and downwardly relative to the traction frame about the substantially horizontal pivot axis on the traction frame, and the lift frame further being pivotally connected to the grass catcher such that the grass catcher pivots about a substantially horizontal pivot axis on the lift frame to adjust the orientation of the grass catcher relative to the lift frame as the lift frame pivots upwardly and downwardly relative to the traction frame; and
(e) a tilt rod extending between the traction frame and the grass catcher to positively tilt the grass catcher forwardly as the lift frame rises.

22. The mower of claim 21, wherein the tilt rod is configured such that the amount of the forward tilting of the grass catcher is sufficient to at least keep the grass catcher level as it lifts.

23. The mower of claim 21, wherein the grass catcher also includes a substantially vertical pivot axis connection to the lift frame to permit the grass catcher to steer or yaw during turns of the traction frame when the grass catcher is in a lowered cutting position.

24. The mower of claim 21, wherein the traction frame is part of a self-propelled riding vehicle.

* * * * *